(No Model.)
J. C., L. & A. P. BRESSLER.
HOUSE MOVING TRUCK.
No. 471,598. Patented Mar. 29, 1892.
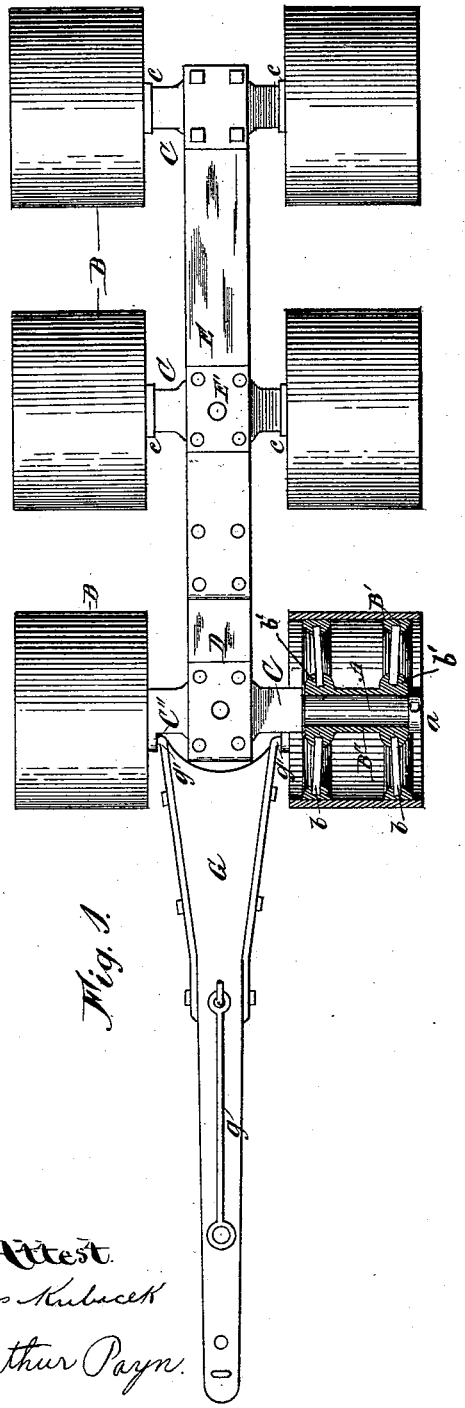
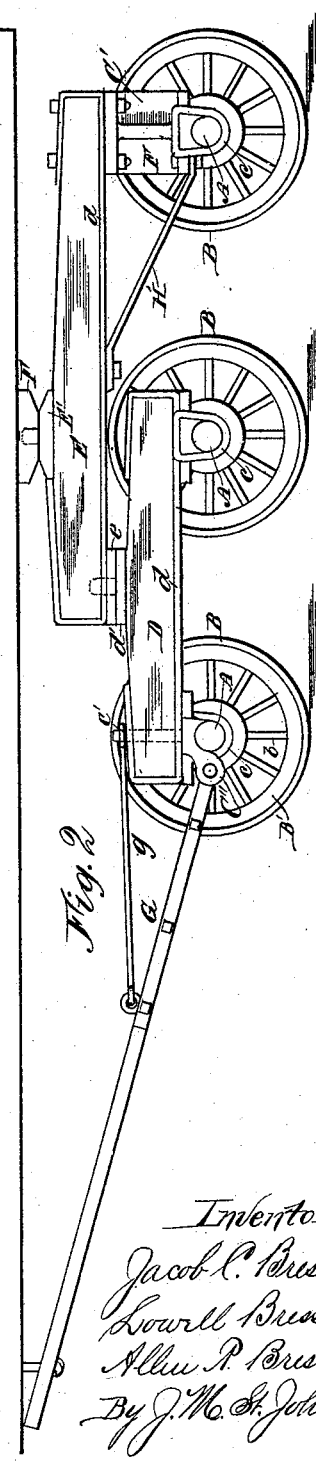

UNITED STATES PATENT OFFICE.

JACOB C. BRESSLER, LOWELL BRESSLER, AND ALLEN P. BRESSLER, OF CEDAR RAPIDS, IOWA.

HOUSE-MOVING TRUCK.

SPECIFICATION forming part of Letters Patent No. 471,598, dated March 29, 1892.

Application filed December 14, 1891. Serial No. 414,979. (No model.)

*To all whom it may concern:*

Be it known that we, JACOB C. BRESSLER, LOWELL BRESSLER, and ALLEN P. BRESSLER, citizens of the United States, residing at Cedar Rapids, in the county of Linn and State of Iowa, have invented certain new and useful Improvements in House-Moving Trucks; and we do hereby declare the following to be a full, clear, and exact description of the invention, such as will enable others skilled in the art to which it appertains to make and use the same.

The object of this invention is to improve the construction of house-moving trucks so as to increase the traction-surface without greatly increasing the draft, and in general to render the truck more portable, strong, and efficient than hitherto.

The invention consists in the construction, combination, and arrangement of parts, as hereinafter fully set forth and claimed.

In the accompanying drawings, forming a part of this specification, Figure 1 is a plan view of a truck embodying our invention, one of the wheels being in section to show the construction thereof. Fig. 2 is a side elevation of the same, the nearer wheels being removed.

Similar letters of reference indicate corresponding parts.

Referring to the drawings, it will be seen that the truck consists, essentially, of a four-wheeled truck to which is connected a two-wheeled trailing truck, the weight-bearings of which are so arranged that the weight of the superimposed building is equally distributed throughout the whole truck.

A A A are the axles, which in practice are simply pieces of large shafting. Near the ends of these are mounted the wheels B B B, having long hubs and a very wide tread. The wheels are held laterally by the bolster-castings C C C on the inside and the collars $a\ a\ a$ on the outside. The wheels of course are free to revolve on the axles.

In the construction of the wheels we use for the rim a band of wide and quite heavy plate iron or steel suitably welded in a ring. Inside of the ring is a pair of cast rings $B'\ B'$ near the edges, respectively. The hub $B''$ is provided with enlargements $b'\ b'$ at or near each end, and in these and the cast rings are secured (as by casting) the wrought iron or steel spokes $b\ b$. These are preferably set dishing both ways, as shown, so as to brace them and render the wheel very strong. The bolster-castings C C C are concaved on the under side to fit the axles, and are suitably connected therewith, as by bands $c\ c\ c$, shrunk or driven tightly thereon. The middle portion of the bolster is widened into a flange, which in the case of the forward one serves as the bolster-plate. This is provided with an upwardly-extending stud $c'$ to serve as a king-bolt. The flanges of the other bolsters connect with the reaches D and E, the former directly and the latter by the extension $C'$, as shown in Fig. 2. The reaches are strong beams of wood bound with iron plates $d\ d$. To give additional strength to the trailer it is provided with a brace H from the reach to the bolster. The reach D is provided in the middle with a bolster-plate $d'$, and on the under side of the forward end of the reach E is a similar one $e$, save that the one has a stud and the other an engaging-socket. One-third of the distance from the center of the forward bearing of the upper reach to the vertical center of the rear axle is placed a bolster-plate $E'$, with a suitable stud thereon to engage with a socket in the cap-plate F, which is placed under the sill of the building to be moved.

In lugs $C''\ C''$ on the forward bolster is attached a tongue G by the bail-irons $g'\ g'$. The tongue is provided with a rod $g$, with an eye in the free end adapted to drop over the projecting upper end of the stud $c'$, and thus hold the tongue elevated, as shown in Fig. 2. The tongue is used in steering the truck when in use—that is to say, the tongue of the forward set. The tongues of the rear trucks are ordinarily attached to the sill of the building, as indicated, the steering being done by the forward truck or trucks. The tongue of the steering-truck being suspended by the rod $g$ and the end of the tongue free, it is but necessary for the operator to push the tongue one way or the other with the hand or foot, the rod allowing the tongue to swing sufficiently for that purpose. In making short turns the ends of all the tongues should be free.

The truck as described possesses several important advantages over any truck known to us. The increase in the number of the wheels from four to six increases the traction by one-half, which is a valuable feature, since it dispenses with much of the necessity for planking the roadway over which the building moves. As an illustration of this, it may be stated that using three sets of these six-wheeled trucks we have been able to move heavy buildings over plowed ground without planking. On ordinary dirt roads planking is seldom required. It will also be understood that the truck has relatively much less vertical movement than a four-wheeled truck, and in passing over obstructions in the road the lift of the building is more easy and gradual. The result is that it is possible to move buildings without planking over roads which would rack them excessively on rollers or the ordinary four-wheeled trucks. Notwithstanding the increase in the length of the truck, it is so flexible as to admit of a building being turned around in its own length, which is practically all that may be done with trucks of any description.

From the nature of its construction the truck is immensely strong and of such durable material as to be practically indestructible.

Having thus described our invention, we claim—

1. A house-moving truck consisting of a four-wheeled truck with one of its axles adapted to turn in a horizontal plane and with a connecting-reach and a two-wheeled trailer connected to the reach of the four-wheeled truck and having its bearing-plate on the connecting-reach practically over the middle axle or one-third the distance back between the bearings of said reach.

2. The combination, in a six-wheeled truck, substantially as described, of the axles A A A, wheels B B B, bolsters C C C, the forward one having stud $c'$ and the rear one the elevated extension C', the reaches D and E, and the bolster or bearing-plates $d'$, $e$, E', and F, all constructed and arranged substantially as and for the purpose set forth.

3. In a house-moving truck, the combination, with a forward truck, substantially as described, of the trailer composed of the axle A and wheels B B, the bolster C, having the extension C', the reach E, having bearing-plate E', and the brace H, substantially as and for the purpose set forth.

4. The combination, in a house-moving truck, substantially as described, of the forward bolster C, having stud $c'$ and lugs C' C', and the connected tongue G, having rod $g$.

5. In a six-wheeled house-moving truck, substantially as described, the herein-described wheel, composed of the wrought iron or steel rim B, the internal cast-rings B' B', the hub B'', having enlargements $b'$ $b'$ at each end, and the spokes $b$ $b$, set dishing each way.

In testimony whereof we affix our signatures in presence of two witnesses.

JACOB C. BRESSLER.
LOWELL BRESSLER.
ALLEN P. BRESSLER.

Witnesses:
LEILA BRESSLER,
IDA SCHUGERT.